Figure 1:
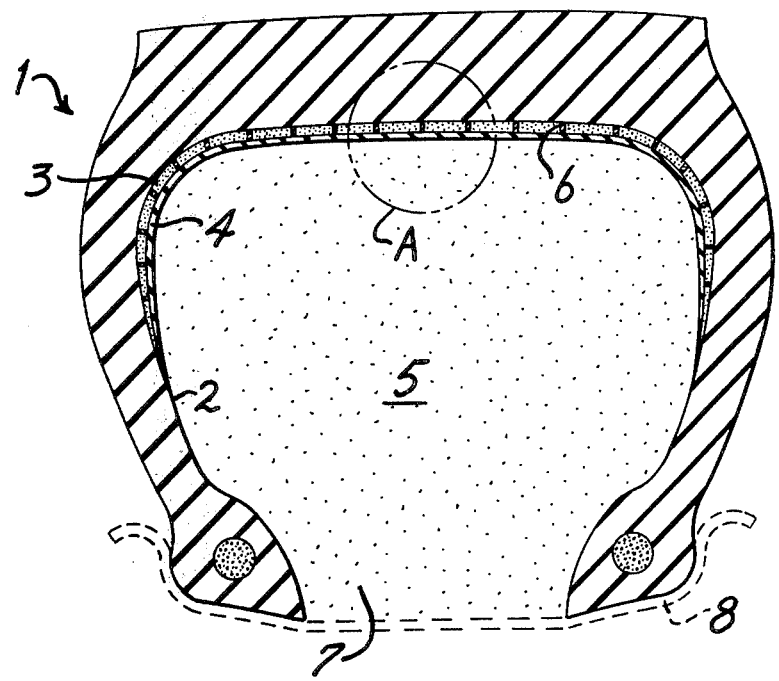

United States Patent [19]

Chautard et al.

[11] 4,256,158
[45] Mar. 17, 1981

[54] PNEUMATIC TIRE WITH PUNCTURE-SEALING LINING COMPRISING A VULCANIZABLE LAYER AND A DISPERSED VULCANIZATION COMPONENT

[75] Inventors: Jean Chautard, Mozac; Andre Chemizard, Clermont-Ferrand, both of France

[73] Assignee: Compagnie Generale des Etablissements Michelin, Clermon-Ferrand, France

[21] Appl. No.: 57,517

[22] Filed: Jul. 13, 1979

[30] Foreign Application Priority Data

Jul. 17, 1978 [FR] France ............... 78 21346

[51] Int. Cl.³ ............... B60C 21/08; B60C 17/00
[52] U.S. Cl. ............... 152/330 RF; 152/330 L; 152/347; 156/115; 428/912; 106/33; 252/72
[58] Field of Search ........ 152/330 RF, 330 L, 330 C, 152/346–348, 330 R; 156/115; 428/912; 106/33; 252/72

[56] References Cited

U.S. PATENT DOCUMENTS

| | | | |
|---|---|---|---|
| 3,291,333 | 12/1966 | House .................. | 428/912 X |
| 3,565,151 | 2/1971 | Courtney ............... | 152/347 |
| 3,920,061 | 11/1975 | Japp et al. ............. | 152/347 X |
| 3,952,787 | 4/1976 | Okado et al. ........... | 152/347 |
| 4,003,419 | 1/1977 | Verdier ................. | 152/347 X |
| 4,037,636 | 7/1977 | Hagenbohmer et al. .... | 152/347 |
| 4,057,090 | 11/1977 | Hoshikawa et al. ...... | 152/347 |
| 4,064,922 | 12/1977 | Farber et al. .......... | 152/347 |
| 4,116,895 | 9/1978 | Kageyama et al. ....... | 252/72 X |
| 4,149,579 | 4/1979 | Senger ................. | 152/347 |

*Primary Examiner*—John T. Goolkasian
*Assistant Examiner*—Lois E. Rogers
*Attorney, Agent, or Firm*—Brumbaugh, Graves, Donohue & Raymond

[57] ABSTRACT

A pneumatic tire having, between two vulcanized elastomeric partitions, a layer of a sealing mixture arranged on the inner wall of the cavity of the tire, at least below the crown and from one shoulder to the other, is improved due to the fact that the layer of sealing mixture has a base of at least one vulcanizable elastomer of low molecular weight, preferably less than 30,000, contains at least one component of a vulcanization system for the vulcanizable elastomer and has an apparent viscosity of between $10^3$ and $10^7$ N/s/m² at 60° Celsius measured with a Weissenberg rheogoniometer at a shear velocity gradient of $10^{-2}$ to $10°s^{31}$ ¹; at least one other component which forms the vulcanization system with the component contained in the sealing mixture being contained in a dispersion within the cavity of the tire.

20 Claims, 2 Drawing Figures

U.S. Patent  Mar. 17, 1981  4,256,158

PNEUMATIC TIRE WITH PUNCTURE-SEALING LINING COMPRISING A VULCANIZABLE LAYER AND A DISPERSED VULCANIZATION COMPONENT

The present invention relates to improvements in pneumatic tires containing means intended to assure the sealing of puncture holes.

The applicants' studies and research have led to the development of complex linings forming at least a part of the covering of the cavity of the tire, in which complex linings there are superimposed sequentially a layer of a vulcanizable sealing mixture, a vulcanized elastomeric partition and a layer of a vulcanizing mixture capable of vulcanizing the vulcanizable sealing mixture, that is to say of cross-linking the quantity of vulcanizable sealing mixture which, under the influence of the escaping air, has penetrated into a puncture hole, in this way effecting a permanent repair of the puncture hole.

This automatic repair complex lining may have, separately or simultaneously, a number of drawbacks. It may, for example, operate only imperfectly when the tire is not at its operating temperature, namely upon the starting of the vehicle or after only a very brief run or in very cold weather. Furthermore, a drop in effectiveness of the complex lining with time can be noted. This drop is due to the migration of the cross-linking agents through the vulcanized elastomeric partition interposed between the vulcanizable sealing mixture and the vulcanizing mixture, but it may also be due to an increase in the viscosity of the products which slows down the flow of the products in the puncture hole and therefore slows down the cross-linking reaction.

The object of the present invention is to overcome these drawbacks by use of a simple lining. For this purpose, the pneumatic tire of the present invention has, between two vulcanized elastomeric partitions, a layer of a vulcanizable sealing mixture which extends at least in part over the inner wall of the tire. The tire is characterized by the fact that the layer of vulcanizable sealing mixture has a base of at least one vulcanizable elastomer of low molecular weight, preferably less than 30,000, contains at least one component of a vulcanization system for the vulcanizable elastomer and has an apparent viscosity of between $10^3$ and $10^7$ N/s/m$^2$ and preferably between $6 \times 10^4$ and $10^6$ N/s/m$^2$ at 60° Celsius measured with a Weissenberg rheogoniometer at a shear velocity gradient of $10^{-2}$ to $10°s^{-1}$; at least one other component which forms the vulcanization system with the component contained in the vulcanizable sealing mixture being contained in a dispersion within the cavity of the tire.

The vulcanization system is formed, as known per se, of at least one vulcanization and at least one vulcanization accelerator. Thus, one of said components of the vulcanization system is contained either in the vulcanizable sealing mixture or in the dispersion within the cavity of the tire, in accordance with the principle of the invention.

The vulcanizable sealing mixture preferably contains up to 75% by weight of a pulverulent or granular filler having a particle size less than 250 microns and/or of a fibrous filler formed of fibers having a length at least equal to 0.5 mm and a diameter between 0.005 and 0.040 mm. This filler increases the sealing power of the vulcanizable sealing mixture and makes it possible to regulate the viscosity thereof.

Either the vulcanization accelerator(s) or the vulcanization agent(s) can be placed in fluid dispersion, for example by spraying, within the cavity of the tire, after having been previously placed in suspension or in solution in a liquid.

However, there may also be used either granular particles of an ultra-light cellular material, such as those used as support lining of a safety tire in accordance with U.S. Pat. No. 4,003,419, or ultra-light very smooth gas-filled microspheres, such as those used as support lining of a safety tire in accordance with U.S. Pat. No. 4,037,636, the disclosures of which patents are incorporated by reference herein. At least some of the granular particles or spheres are at least partially coated with either the vulcanization agent or with the vulcanization accelerator in powdered state or contained in a suspension or solution, for example, in the lubricant, the carriers of which are the granular particles in accordance with U.S. Pat. No. 4,003,419.

In a third embodiment, there is used a liquid or gel in which the other component of the vulcanization system is placed in solution or suspension. This liquid or gel may be a lubricant present in sufficient amount within the cavity of the tire (in the absence of a support lining) to avoid damage to the tire when it travels with an inflation pressure which is less than normal pressure.

Variant embodiments of the invention are illustrated by the following examples:

EXAMPLE I: VULCANIZATION ACCELERATOR IN THE CAVITY OF THE TIRE

|  | Parts by Weight |
|---|---|
| Vulcanizable Sealing Mixture: | |
| depolymerized natural rubber | 80 |
| polyisobutylene (average molecular weight 15,000) | 20 |
| carbon black | 125 |
| zinc oxide | 10 |
| Lubricant Containing the Vulcanization Accelerator: | |
| silicone emulsion | 65 |
| ethanol | 30 |
| synthetic oil having a base of ether of polyglycols | 5 |
| quaternary ammonium (alkyldimethyl-benzylammonium chloride) | 300 ppm |
| sodium isopropylxanthate | 5 |
| sulfur | 5 |

EXAMPLE II: ONE OF THE COMPONENTS OF THE VULCANIZATION SYSTEM IN THE VULCANIZABLE SEALING MIXTURE

|  | Parts by Weight |
|---|---|
| Vulcanizable Sealing Mixture: | |
| polyisobutylene-isoprene copolymer (average molecular weight 30,000) | 100 |
| vulcanized rubber powder (particle size: 90% of particles of a diameter less than 160 microns) | 180 |
| manganese dioxide | 10 |
| cobalt naphthenate | 1 |
| Vulcanization Agent Contained in the Cavity of the Tire: | |
| parabenzoquinone dioxime. | |

This vulcanization agent can be dispersed:
either on the surface of granular particles or spheres, at least partially coating them,
or in a lubricant used alone or in combination with granular particles or spheres.

Lubricant:

| water | 50 cc |
|---|---|
| ethanol | 30 cc |
| polyglycols | 20 cc |

EXAMPLE III: GELATED LUBRICANT

| | Parts by Weight |
|---|---|
| Vulcanizable Sealing Mixture: | |
| 1,2-polybutadiene (80%) of low molecular weight (average molecular weight 30,000) | 50 |
| polyisobutylene (average molecular weight about 12,000) | 50 |
| carbon black | 115 |
| zinc oxide | 4 |
| phenol resin | 10 |
| antioxidant | 2 |
| Gelated Lubricant: | |
| silicone emulsion | 65 |
| ethanol | 30 |
| synthetic oil having a base of ethers of polyglycols | 5 |
| quaternary ammonium(alkyldimethyl-benzylammonium chloride) | 300 ppm |
| sulfur | 6 |
| zinc isopropylxanthate | 1 |
| diethylammonium diethyl dithiocarbamate | 3 |
| silica | 5 |

The drawing shows diagrammatically, in meridian or transverse section in

FIG. 1, a tire 1 whose inner wall 2 is provided with a layer 3 of vulcanizable sealing mixture.

Figure 2:
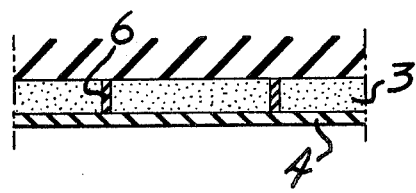

FIG. 2, the detail view, shown on a larger scale than in FIG. 1, is a portion of the tire included within the circle A. The layer 3 is covered with a vulcanized elastomeric partition 4 on the side of the cavity 5 of the tire 1. The layer 3 is compartmentalized by circumferential vulcanized elastomeric partitions 6 in order to prevent the vulcanizable sealing mixture from accumulating below the meridian zone of the crown under the effect of centrifugal force. The different forms of the dispersion of the vulcanization agent or vulcanization accelerator present in the cavity 5 of the tire 1 are indicated symbolically by the dots 7. This cavity 5 is closed by the rim 8 on which the tire 1 is mounted.

It is obvious that the layer 3 may extend either under the entire inner wall 2 or only over one or more portions thereof.

What is claimed is:

1. A pneumatic tire having, between two vulcanized elastomeric partitions, a layer of a vulcanizable sealing mixture which extends at least in part over the inner wall of the tire, characterized by the fact that the layer of vulcanizable sealing mixture has a base of at least one vulcanizable elastomer of low molecular weight less than 30,000, contains at least one component of a vulcanization system for the vulcanizable elastomer and has an apparent viscosity of between $10^3$ and $10^7$ N/s/m$^2$ and preferably between $6 \times 10^4$ and $10^6$ N/s/m$^2$ at 60° Celsius measured with a Weissenberg rheogoniometer at a shear velocity gradient of $10^{-2}$ to $10°s^{-1}$; at least one other component which forms the vulcanization system with the component contained in the vulcanizable sealing mixture being contained in a dispersion within the cavity of the tire.

2. The tire according to claim 1, characterized by the fact that the vulcanization system is formed, as known per se, of at least one vulcanization agent and at least one vulcanization accelerator, one of said components of the vulcanization system being contained in the vulcanizable sealing mixture and the other contained in the dispersion within the cavity of the tire.

3. The tire according to claim 1 or claim 2, characterized by the fact that the vulcanizable sealing mixture contains up to 75% by weight of a pulverulent or granular filler having a particle size less than 250 microns.

4. The tire according to claim 2, characterized by the fact that the vulcanization agent is placed in suspension in a liquid prior to placing it in the fluid dispersion within the cavity of the tire.

5. The tire according to claim 2, characterized by the fact that the vulcanization agent is coated at least in part onto granular particles of ultra-light cellular material prior to placing it in the fluid dispersion within the cavity of the tire.

6. The tire according to claim 2, characterized by the fact that the vulcanization agent in the dispersion within the tire cavity is in solution in a lubricant.

7. The tire according to claim 6, characterized by the fact that the lubricant coates, at least in part, granular particles of ultra-light cellular material.

8. The tire according to claim 1 or claim 2, characterized by the fact that the vulcanizable sealing mixture contains up to 75% by weight of a fibrous filler formed of fibers having a length at least equal to 0.5 mm and a diameter of between 0.005 and 0.040 mm.

9. The tire according to claim 1 or claim 2, characterized by the fact that the vulcanizable sealing mixture contains up to 75% by weight of a pulverulent or granular filler having a particle size less than 250 microns and of a fibrous filler formed of fibers having a length at least equal to 0.5 mm and a diameter between 0.005 and 0.040 mm.

10. The tire according to claim 2, characterized by the fact that the vulcanization agent is placed in solution in a liquid prior to placing it in the fluid dispersion within the cavity of the tire.

11. The tire according to claim 2, characterized by the fact that the vulcanization accelerator is placed in suspension in a liquid prior to placing it in the fluid dispersion within the cavity of the tire.

12. The tire according to claim 2, characterized by the fact that the vulcanization accelerator is placed in solution in a liquid prior to placing it in the fluid dispersion within the cavity of the tire.

13. The tire according to claim 2, characterized by the fact that the vulcanization agent is coated at least in part onto ultra-light spheres which are filled with gas prior to placing it in the fluid dispersion within the cavity of the tire.

14. The tire according to claim 2, characterized by the fact that the vulcanization accelerator is coated at least in part onto granular particles of ultra-light cellular material prior to placing it in the fluid dispersion within the cavity of the tire.

15. The tire according to claim 2, characterized by the fact that the vulcanization accelerator is coated at least in part onto ultra-light spheres which are filled with gas prior to placing it in the fluid dispersion within the cavity of the tire.

16. The tire according to claim 2, characterized by the fact that the vulcanization agent in the dispersion within the tire cavity is in dispersion in a lubricant.

17. The tire according to claim 2, characterized by the fact that the vulcanization accelerator in the dispersion within the tire cavity is in solution in a lubricant.

18. The tire according to claim 2, characterized by the fact that the vulcanization accelerator in the dispersion within the tire cavity is in dispersion in a lubricant.

19. The tire according to claim 6, characterized by the fact that the lubricant coats, at least in part, ultra-light spheres which are filled with gas.

20. The tire according to claim 6, characterized by the fact that the lubricant coats, at least in part, granular particles of ultra-light cellular material and ultra-light spheres which are filled with gas.

* * * * *

UNITED STATES PATENT AND TRADEMARK OFFICE
CERTIFICATE OF CORRECTION

PATENT NO. : 4,256,158

DATED : March 17, 1981

INVENTOR(S) : Jean Chautard et al

It is certified that error appears in the above—identified patent and that said Letters Patent is hereby corrected as shown below:

First page, Item 73, "Clermon-Ferrand" should read -- Clermont-Ferrand --. First page, fourth line from the bottom of ABSTRACT, "$10°s^{31}$ $1$" should read -- $10^0 s^{-1}$ --.
Col. 1, line 55, after "vulcanization" insert -- agent --.
Col. 4, line 30, "coates" should read -- coats --.

Signed and Sealed this

Twenty-first Day of July 1981

[SEAL]

Attest:

Attesting Officer

GERALD J. MOSSINGHOFF

Commissioner of Patents and Trademarks